United States Patent [19]

Roger et al.

[11] Patent Number: 5,410,202
[45] Date of Patent: Apr. 25, 1995

[54] WOUND ELECTRIC-MOTOR STATOR

[75] Inventors: Michel A. J. Roger, Magland; Philippe M. Lemarchand, Taninges, both of France

[73] Assignee: Somfy, Cluses, France

[21] Appl. No.: 142,176

[22] Filed: Oct. 25, 1993

[30] Foreign Application Priority Data

Dec. 16, 1992 [FR] France .................. 92 15189

[51] Int. Cl.6 .................. H02K 11/00; H02K 3/46; B65H 81/06
[52] U.S. Cl. .................. 310/71; 310/260; 242/1.1 R
[58] Field of Search .............. 310/42, 71, 194, 260; 242/1.1 R; 248/158, 175; 29/596; 140/71 C

[56] References Cited

U.S. PATENT DOCUMENTS

| 1,753,554 | 3/1927 | Dewey | 242/7.05 R |
| 3,027,475 | 3/1962 | Gaudry | 310/260 |
| 3,719,840 | 3/1973 | Burckhardt et al. | 310/71 |
| 3,984,714 | 10/1976 | Grözinger et al. | 310/194 |
| 4,000,764 | 1/1977 | Reiger, Jr. | 242/7.11 |
| 4,490,636 | 12/1984 | McBratney | 310/71 |
| 5,270,603 | 12/1993 | Narumi | 310/260 |

FOREIGN PATENT DOCUMENTS 2550981 3/1985 France .
137602 10/1979 Japan .................. 310/260

Primary Examiner—Thomas M. Dougherty
Assistant Examiner—Clayton E. LaBalle
Attorney, Agent, or Firm—Laff, Whitesel, Conte & Saret, Ltd.

[57] ABSTRACT

A wound electric-motor stator (1) equipped with a device for the temporary storage of the wires (6) of the winding of the stator. This storage device consists, on the one hand, of the stator itself (5) and, on the other hand, of an auxiliary piece (10) provided with a catch (12) for catching on the stator and with a hole (13), for fastening the end of the wires (6) of the stator. These wires (6) can be wound by driving the auxiliary piece in rotation.

10 Claims, 3 Drawing Sheets

WOUND ELECTRIC-MOTOR STATOR

FIELD OF THE INVENTION

The subject of the present invention is a wound electric-motor stator comprising means for storing a particularly length of stator winding wire while waiting for its subsequent connection.

PRIOR ART

The invention relates more particularly to a problem associated with wound stators between the moment when the stator has been provided with its winding and the moment when this stator, associated with a rotor to form a motor, is mounted in an appliance, a machine or a device. During this interval, the wound stator has more or less long wires projecting from the winding and intended for connecting the stator to terminals which can be at a greater or lesser distance from the stator, depending on the appliance in which it is to be mounted. During this interval, the stator is handled for stocking, packaging, transport and finally mounting. During each of these handling operations, the wires projecting from the stator are exposed to all kinds of stresses liable to damage the wires, in particular to damage the insulation, or even to bring about the breaking or cutting of the conductor. In one instance or the other, such a fault makes it necessary to dismount the appliance, in whiich the motor was mounted, and to replace the stator. However, the cost of dismounting and of a wound stator is high.

The U.S. Pat. No. 4,000,764 discloses an appliance making it possible to wind a particular length of winding wire of a stator on small posts fastened to the stator. This solution makes it possible to store only a small length of wires, and the wound wire, constricted to a small diameter, cannot be unwound easily in order to connect it to a terminal which, moreover, must be nearby, let alone the risks of damage to the insulation of the wire during the winding and unwinding of the wire.

SUMMARY OF THE INVENTION

The object of the invention is to make it possible to store a long length of wires of the stator in a flexible way and to eliminate the risks of damage to these wires.

The wound electric-motor stator according to the invention is defined in that it is equipped with an auxiliary piece provided, on the one hand, with means for catching on the stator and, on the other hand, with means for fastening the end of the wires of the winding of the stator, and in that it has catching means complementary with those of the auxiliary piece, the auxiliary piece caught in the stator constituting, together with the stator, a device for the temporary storage of the wires of the winding of the stator.

Whatever the length of the wires attached to the stator, these are stored, in particular enclosed in a receptacle, in such a way that the wound stator can be handled without risk to these wires and much more easily.

The auxiliary piece will generally be removed during the mounting of the motor in an appliance. In this case, if appropriate, it can be reused. The auxiliary piece can be also be used as a connector.

BRIEF DESCRIPTION OF THE DRAWINGS

The accompanying drawing illustrates eight embodiments of the invention by way of example.

DESCRIPTION OF THE PREFERRED EMBODIMENTS

Figure 1:
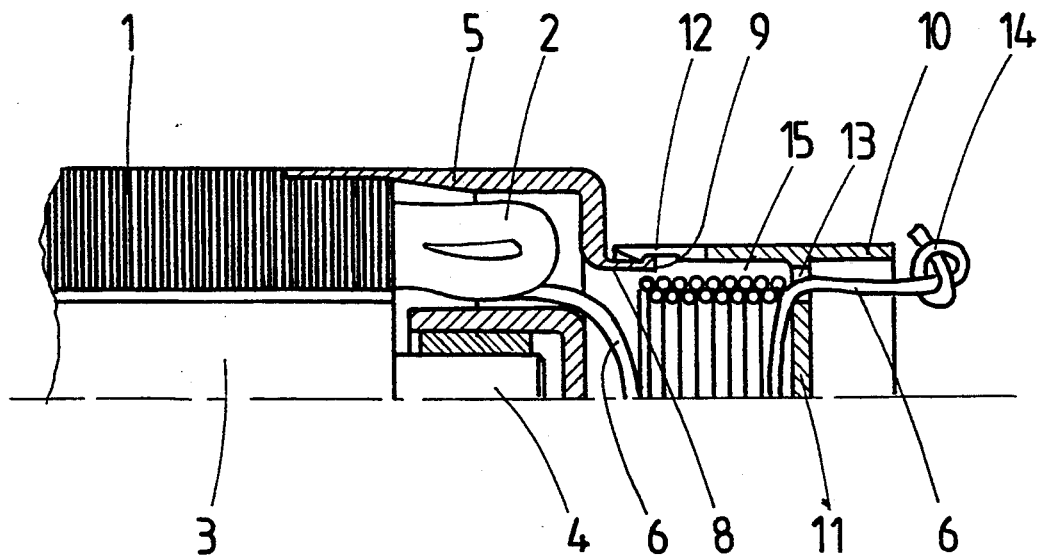
FIG. 1 is a partial view in axial half-section of a wound stator according to a first embodiment.

FIG. 1 shows partially an electric motor consisting of a stator 1 provided with a winding 2 and of a rotor 3, one end of the shaft 4 of which is mounted rotatably in the frame 5 of the stator. A strand of wires 6 projects from the winding of the stator so as to connect the latter to the terminals of a supply.

The frame 5 of the stator has an axial extension in the form of a cylindrical tubular bearing surface 8, the end of which is provided with a bead 9. Caught on this bearing surface 8 is an auxiliary piece 10 of tubular shape and provided with a radial wall 11. The end of the auxiliary piece 10 facing the stator is split longitudinally over a particular length, so as to form a particular number of elastic tongues 12 terminating in a hook which catches elastically on the bead 9 of the bearing surface 8 of the stator. This type of snap catch is well known per se. The wall 11 of the auxiliary piece has a hole 13 serving for the passage of the strand of wires 6, at the end of which a knot 14 is formed, so as to retain the end of the strand on the auxiliary piece 10.

The auxiliary piece 10 forms, together with the stator, a receptacle 15, in which a substantial length of strand 6 can be stored. This storage can take place simply in loose form or by winding, as shown in the drawing, the auxiliary piece 10 for this purpose being driven in rotation about a bearing surface 8 of the stator.

The auxiliary piece 10 is preferably made of plastic. During the mounting of the motor in an appliance, the piece 10 is detached from the stator and the strand of wires 6 is detached from the auxiliary piece in order to be fastened to the terminals of the electrical supply of the appliance or of the device intended to be equipped with the motor.

Figure 2:
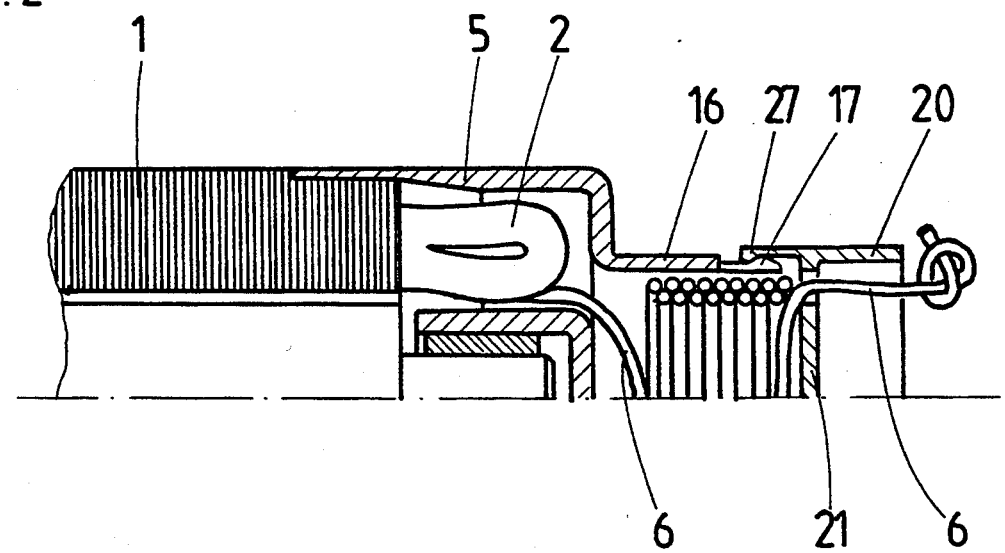
FIG. 2 is a similar view of a second embodiment.

The second embodiment, illustrated in FIG. 2, differs from the first embodiment in that the receptacle for storing the strand of wires 6 consists essentially of a tubular extension 16 of the stator, said extension being provided with elastic hooks 17, on which catches, by means of a bead 27, an auxiliary piece 20 of the same shape as the auxiliary piece 10, but substantially shorter and, like the latter, provided with a radial wall 21 which closes the receptacle and which at the same time serves for retaining the strand of wires.

Figure 3:
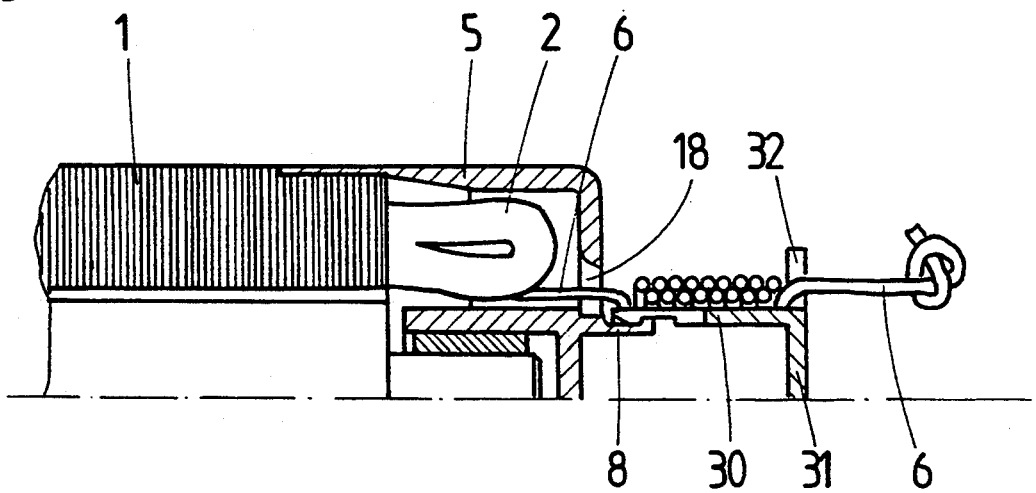
FIG. 3 is a similar view of a third embodiment.

The third embodiment, illustrated in FIG. 3, differs from the first embodiment in that the strand of wires 6 projects from the stator via a passage 18 located outside the tubular bearing surface 8 and is wound around the bush-shaped auxiliary piece 30, the bottom 31 of which is provided with notches 32 for retaining the end of the strand of wires 6. The strand of wires of the stator is wound onto the auxiliary piece 30 by driving this piece in rotation about the bearing surface 8.

Figure 4:
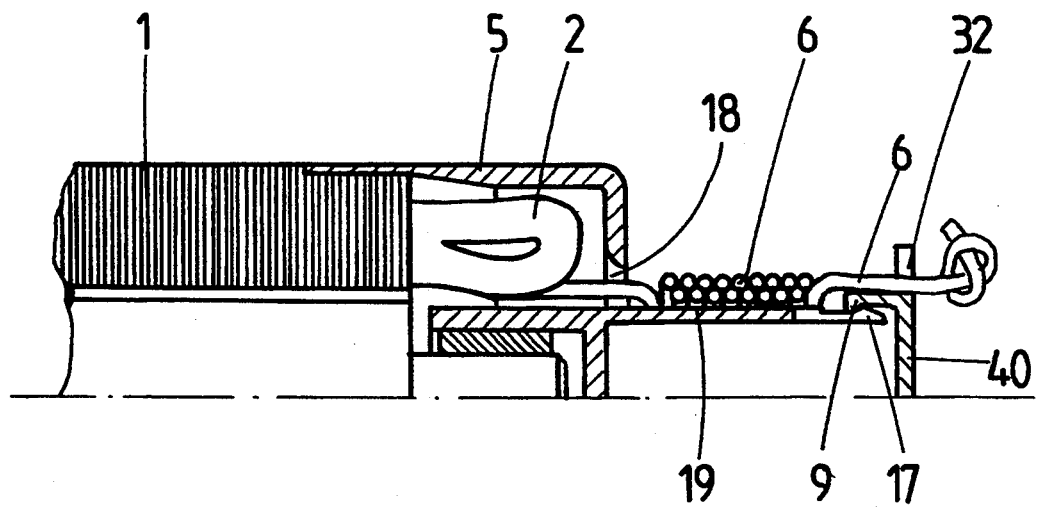
FIG. 4 is a similar view of a fourth embodiment.

The fourth embodiment, illustrated in FIG. 4, differs from the preceding embodiment in that the stator has a tubular extension 19 similar to the extension 16 of FIG. 2, and in that the auxiliary piece 40 is short and catches on the elastic hooks 17 by means of a bead 9'. The strand of wires 6 is wound around the extension 19 by driving the auxiliary piece 40 in rotation.

Figure 5:
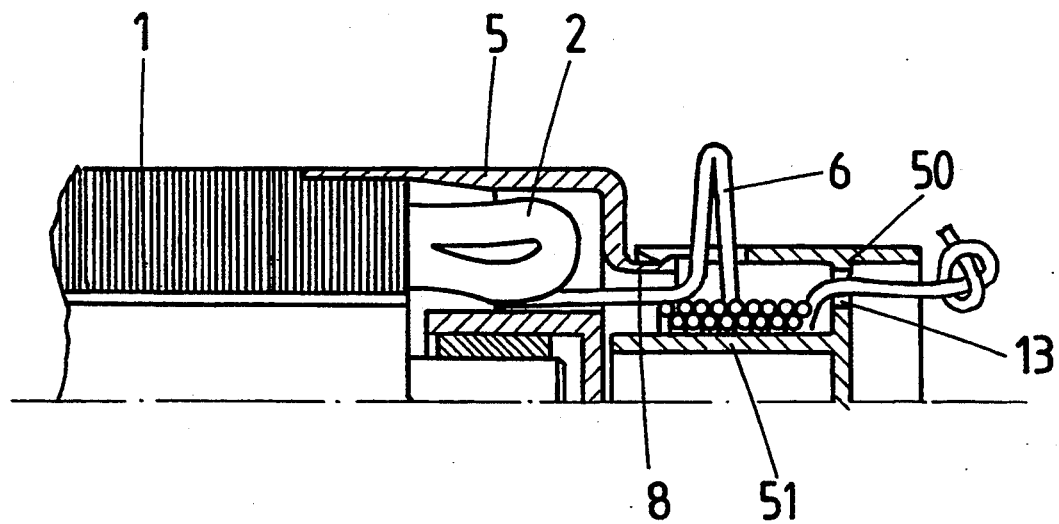
FIG. 5 is a similar view of a fifth embodiment.

The fifth embodiment, illustrated in FIG. 5, differs from the first embodiment shown in FIG. 1, in that the auxiliary piece 10 is replaced by an auxiliary piece 50 provided with a cylindrical inner part 51 concentric relative to the tubular outer part of the auxiliary piece. The strand of wires 6 is wound around the part 51 by driving the auxiliary piece 50 in rotation on the bearing surface 8 of the stator.

Figure 6:
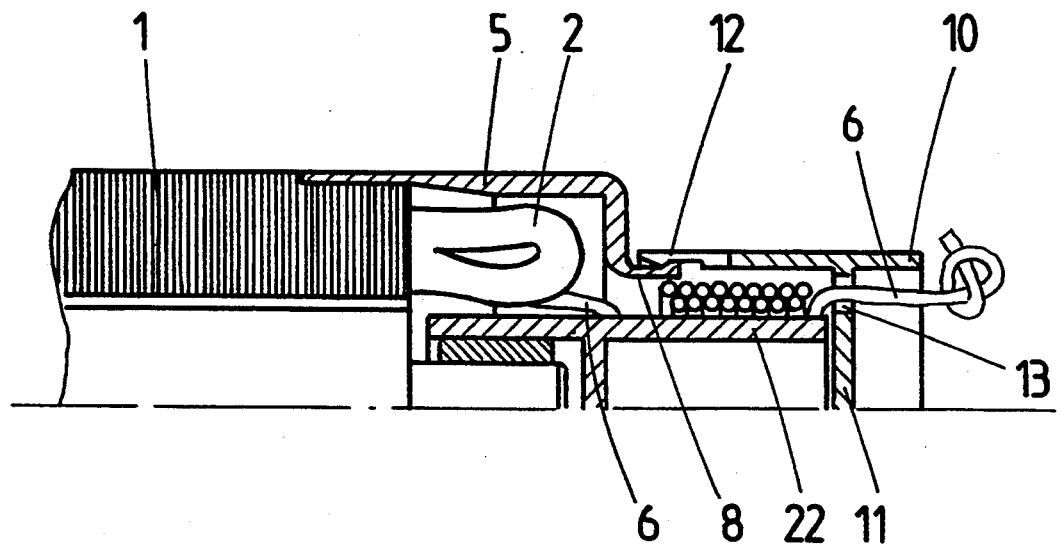
FIG. 6 is a similar view of a sixth embodiment.
Figure 7:
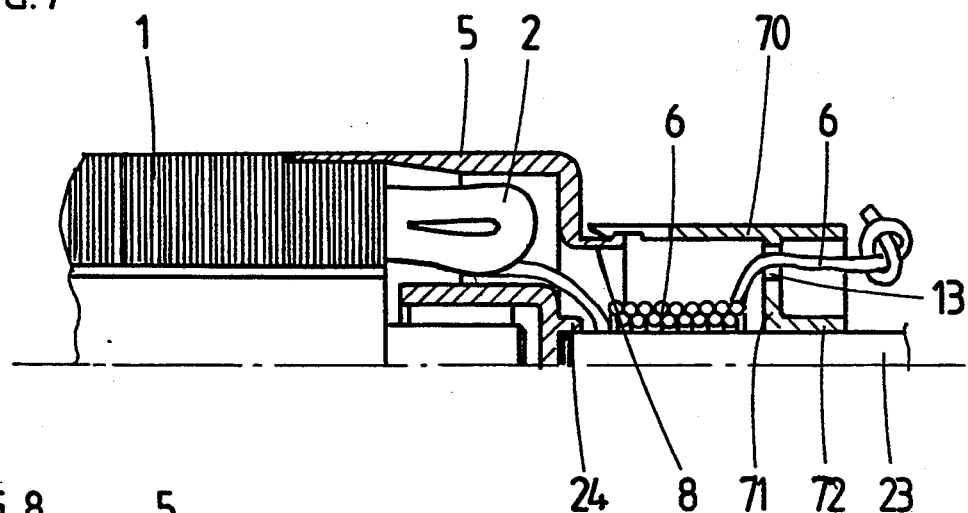
FIG. 7 is a similar view of a seventh embodiment.

The sixth embodiment, illustrated in FIG. 6, differs from the first embodiment in that the stator has a cylindrical extension 22 which is coaxial with the bearing surface 8 and around which the strand of wires 6 is wound when the auxiliary piece is driven in rotation.

The seventh embodiment differs from the first embodiment in that the auxiliary piece 10 is replaced by an auxiliary piece 70, of which the transverse wall 71 corresponding to the wall 11 has a passage 72 for a mandrel 23, the end of which is, moreover, guided by a guide 24 formed in the stator. The strand of wires 6 is wound onto the mandrel 23 by driving the auxiliary piece 70 in rotation, and then the mandrel 23 is removed. This auxiliary mandrel makes it possible to form a regular and compact winding of the strand of wires 6.

Figure 8:
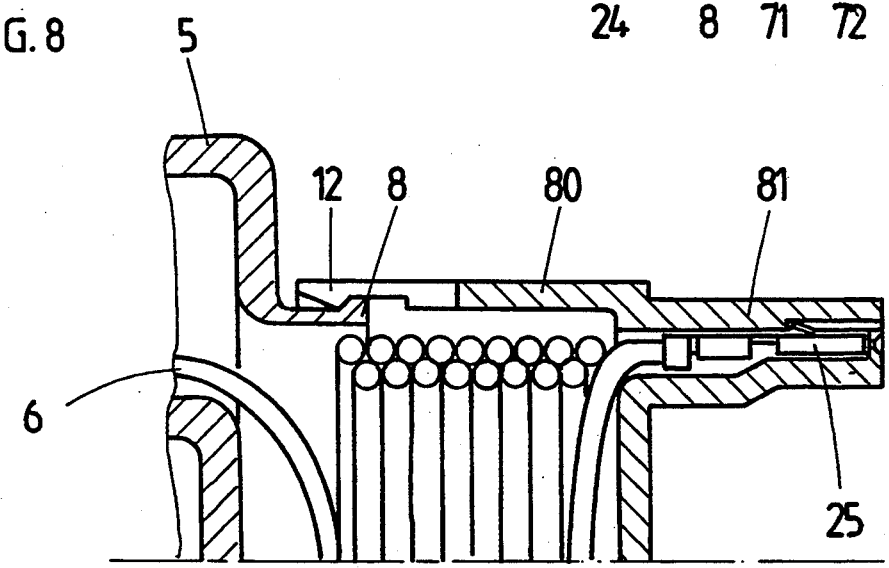
FIG. 8 is a partial view of an eighth embodiment on a larger scale.

FIG. 8 illustrates an eighth embodiment, in which the auxiliary piece is used as a connector. This embodiment differs from the first embodiment in that it comprises an auxiliary piece 80 provided with a nose 81, in which sockets 25 previously crimped to the ends of the strand of wires 6 are fastened before the auxiliary piece 60 catches on the stator. During the installation of the motor, the auxiliary piece 80 is detached from the stator and connected to the electrical supply.

Figure 9:
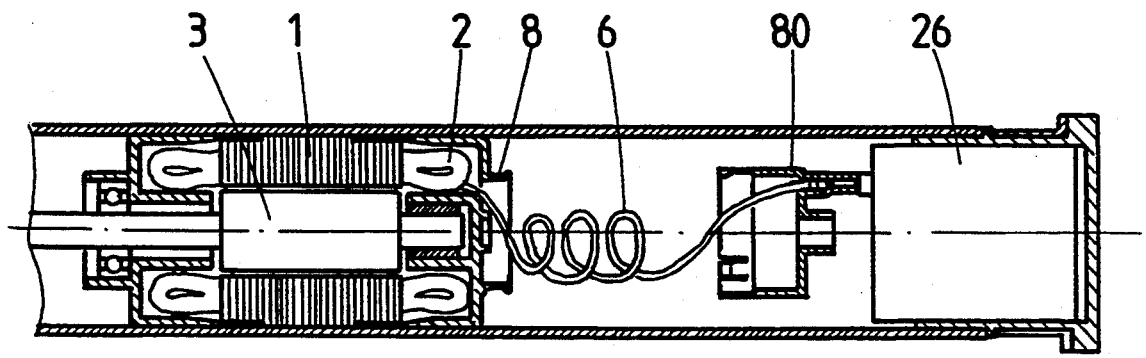
FIG. 9 shows an example of the mounting of a stator according to FIG. 8 in a tubular motor.

FIG. 9 illustrates a stator according to the last embodiment, mounted in a tubular motor. The auxiliary 80 has been detached from the stator and connected to a supply unit 26.

We claim:

1. A wound electric-motor stator (1) comprising removable temporary storage means for temporarily storing a particular length of stator winding wire while waiting for subsequent connection of said winding wire, said temporary storage means having storage attaching means for removably attaching said storage means to said stator and wire attaching, means (13; 32; 81) for fastening the end of the stator winding wires (6), and said stator having stator catching means (9; 17) complementary with the storage attaching means to removably hold the storage means on the stator wherein when said storage means is attached to said stator, said storage means together with the stator, provides a device for the temporary storage of the stator winding wires.

2. The stator as claimed in claim 1, wherein the catching means of the stator are formed on a cylindrical axial bearing surface (8; 16; 19) of the stator, and wherein an auxiliary piece catches on this bearing surface by means of a circular part.

3. The stator as claimed in claim 2, wherein the circular part of the auxiliary piece (10; 50; 70) is tubular and at least partially closed at one end so as to form a storage receptacle for the wires of the stator.

4. The stator as claimed in claim 3, wherein the auxiliary piece has a cylindrical inner part (51) which is concentric with the tubular catching part and onto which the wires of the stator cad be wound by driving the auxiliary piece in rotation about the bearing surface of the stator.

5. The stator as claimed in claim 3, wherein the auxiliary piece (70) has an axial passage (72) making it possible to introduce a mandrel (23) for winding the wires of the stator onto this mandrel by driving the auxiliary piece in rotation on the bearing surface of the stator.

6. The stator as claimed in claim 2, wherein the axial bearing surface (16) of the stator is tubular and forms a storage receptacle for the wires of the stator, this receptacle being closed by the auxiliary piece (20).

7. The stator as claimed in claim 3, defined in that the stator has a cylindrical part (22) concentric with the axial bearing surface of the stator and of a diameter smaller than the diameter of this axial bearing surface, the wires of the stator being capable of being wound onto the cylindrical part by driving the auxiliary piece in rotation on the bearing surface of the stator.

8. The stator as claimed in claim 6, defined in that the stator has a cylindrical part (22) concentric with the axial bearing surface of the stator and of a diameter smaller than the diameter of this axial bearing surface, the wires of the stator being capable of being wound onto the cylindrical part by driving the auxiliary piece in rotation on the bearing surface of the stator.

9. The stator as claimed in claim 2, wherein the axial cylindrical bearing surface (8; 19) of the stator and the circular catching part of the auxiliary piece (30; 40) form a drum, onto which the wires of the stator can be wound by driving the auxiliary piece in rotation on the cylindrical bearing surface of the stator.

10. The stator as claimed in claim 1, wherein the ends of the wires of the stator are fastened permanently an auxiliary piece (80), and wherein the latter also forms a connector.

* * * * *

UNITED STATES PATENT AND TRADEMARK OFFICE
CERTIFICATE OF CORRECTION

PATENT NO. : 5,410,202
DATED : April 25, 1995
INVENTOR(S) : Michel A.J. Roger and Philippe M. Lemarchand It is certified that error appears in the above-indentified patent and that said Letters Patent is hereby corrected as shown below:

Column 4, line 51, after "permanently" add --to--.

Signed and Sealed this

Fourteenth Day of November, 1995

Attest:

BRUCE LEHMAN

Attesting Officer    Commissioner of Patents and Trademarks